United States Patent
Yi et al.

(10) Patent No.: US 10,354,651 B1
(45) Date of Patent: Jul. 16, 2019

(54) HEAD-MOUNTED DEVICE CONTROL BASED ON WEARER INFORMATION AND USER INPUTS

(71) Applicant: SONY CORPORATION, Tokyo (JP)

(72) Inventors: Hyehoon Yi, San Diego, CA (US); David Young, San Diego, CA (US); Keith Resch, San Diego, CA (US); Gregory Carlsson, San Diego, CA (US); Bibhudendu Mohapatra, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/126,403

(22) Filed: Sep. 10, 2018

(51) Int. Cl.
| | |
|---|---|
| *H04R 1/10* | (2006.01) |
| *G10L 15/26* | (2006.01) |
| *H04R 5/04* | (2006.01) |
| *G06F 3/16* | (2006.01) |

(52) U.S. Cl.
CPC ............ *G10L 15/265* (2013.01); *G06F 3/165* (2013.01); *G06F 3/167* (2013.01); *H04R 1/1083* (2013.01); *H04R 5/04* (2013.01); *H04R 2420/01* (2013.01); *H04R 2460/01* (2013.01)

(58) Field of Classification Search
CPC ....................................................... H04R 1/10
See application file for complete search history.

(56) References Cited

U.S. PATENT DOCUMENTS

| | | | |
|---|---|---|---|
| 9,728,188 B1 * | 8/2017 | Rosen | G10L 15/22 |
| 10,019,964 B1 * | 7/2018 | Patel | G09G 5/003 |
| 2005/0060157 A1 * | 3/2005 | Daugherty | G06F 21/32 |
| | | | 704/273 |
| 2014/0044269 A1 | 2/2014 | Anderson | |
| 2015/0222977 A1 | 8/2015 | Angel, Jr. | |
| 2015/0229756 A1 * | 8/2015 | Raniere | H04W 12/06 |
| | | | 455/411 |
| 2015/0373467 A1 | 12/2015 | Gelter | |
| 2016/0269841 A1 | 9/2016 | Shinde | |
| 2017/0178668 A1 * | 6/2017 | Kar | G10L 25/78 |
| 2018/0067717 A1 * | 3/2018 | Limaye | G06F 1/163 |

* cited by examiner

*Primary Examiner* — Olisa Anwah
(74) *Attorney, Agent, or Firm* — Chip Law Group

(57) ABSTRACT

A head-mounted device (HMD) that includes at least one speaker, at least one audio capturing device and circuitry is provided. The circuitry receives, via the at least one audio capturing device, a user input that corresponds to an audio input. The circuitry further determines a first location of a source of the received audio input, based on the received audio input. The circuitry further determines that the received audio input is enunciated from a wearer of the HMD in a worn state of the HMD, based on the determined first location of the source of the received audio input. The circuitry further controls at least a function of the HMD, based on the determination that the received audio input is enunciated from the wearer.

19 Claims, 9 Drawing Sheets

US 10,354,651 B1

HEAD-MOUNTED DEVICE CONTROL BASED ON WEARER INFORMATION AND USER INPUTS

CROSS-REFERENCE TO RELATED APPLICATIONS/INCORPORATION BY REFERENCE

None.

FIELD

Various embodiments of the disclosure relate to smart wearable technologies. More specifically, various embodiments of the disclosure relate to an apparatus and a method to control a head-mounted device (HMD) based on wearer information and user inputs.

BACKGROUND

Recent advancements in the field of smart wearable technologies have led to development of various applications to control a head-mounted device (HMD) based on voice inputs from a wearer of the HMD. Typically, voice controlled HMDs are configured to receive voice inputs through an integrated microphone and control execution of different functions in response to the voice input. Examples of the functions may include media playback functions, device on/off functions, noise cancellation functions, and the like. In certain scenarios, the HMD may be susceptible to receive and act upon voice inputs from different voice sources ambient to the wearer. For example, the HMD may receive a voice input from a person present in the vicinity of the wearer of the HMD and may control different functions of the HMD in response to the voice input from the person. The execution of different functions of the HMD in response to voice inputs from ambient voice sources may interrupt a function of the HMD, as desired by the wearer and may cause inconvenience to the wearer.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for control of a head-mounted device (HMD) based on wearer information and user inputs is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for control of a head-mounted device (HMD), based on wearer information and user inputs. Exemplary aspects of the disclosure provide an HMD, which may be configured to receive an audio input and detect whether a source of the audio input is a wearer of the HMD. The disclosed HMD may selectively act upon voice commands from the wearer while filtering voice commands from other sources (such as a different speaker or other audio sources) that may be ambient to the wearer. Accordingly, the disclosed HMD may control different functions of the HMD device in response to the audio input from the wearer. The audio input from other sources (i.e. sources other than the wearer) may be discarded, which may prevent undesired interruptions in desired functions of the HMD. The disclosed HMD may robustly determine whether the source of the audio input is the wearer, without relying on computationally intensive techniques, such as voice or speech recognition, machine learning, and/or digital audio fingerprinting techniques. Thus, the disclosed HMD improves the experience of the wearer based on elimination of unwanted interruptions and provides a seamless user experience through the HMD.

Figure 1:
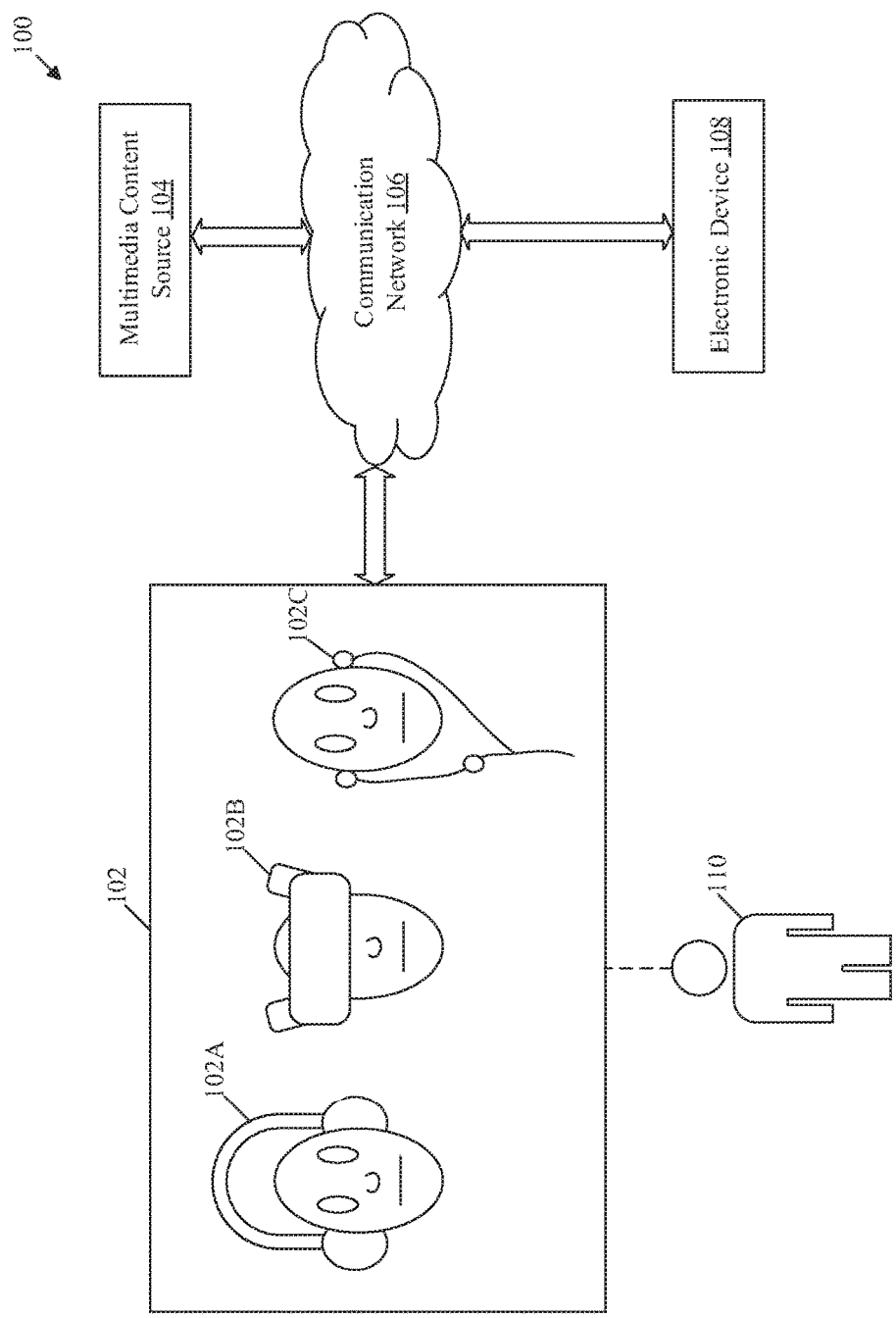
FIG. 1 is a block diagram that illustrates an exemplary network environment for control of a head-mounted device (HMD) based on wearer information and user inputs, in accordance with an embodiment of the disclosure.

FIG. 1 is a block diagram that illustrates an exemplary network environment for control of a head-mounted device (HMD) based on wearer information and user inputs, in accordance with an embodiment of the disclosure. With reference to FIG. 1, there is shown a network environment 100. The network environment 100 may include a HMD 102, a multimedia content source 104, a communication network 106, and an electronic device 108. There is also shown a user 110 who may be a wearer of the HMD 102. The HMD 102 may be communicatively coupled to the multimedia content source 104 and the electronic device 108, via the communication network 106.

The HMD 102 may comprise suitable logic, circuitry and interfaces that may be configured to control playback of multimedia content and other control functions based on different user inputs. The user inputs may be received from the user 110 via a plurality of audio capturing devices (not shown). The user inputs may correspond to audio inputs (or voice inputs) from the user 110. In certain embodiments, the user input may correspond to an input other than a voice input (or an audio input) from the user 110. Examples of such user input may include, but are not limited to, a twitch input, a gesture input, a physical tap, a bio-signal (e.g., electroencephalogram (EEG) or electrocardiogram (ECG) signal from user's body), a haptic input, and a flutter input. In certain embodiments, such user input may be represented as an instruction, such as an audio input) for the HMD 102.

Examples of the HMD 102 may include, but are not limited to, a headphone 102A, an audio-video (AV) entertainment device 1028, an earphone 102C, a smart glass, a virtual-reality (VR) device, a display device, a video-conferencing device, a gaming device, and/or a consumer electronic (CE) device. In accordance with an embodiment, a media player device may be integrated with the HMD 102. The media player device may be configured to store, decode, and deliver presentable output media content to different parts, for example, a display, a set of speakers, or in-ear speakers, of the HMD 102. Examples of the media player device may include, but are not limited to, an audio player, a VR player, and an audio/video (A/V) player.

The multimedia content source 104 may comprise suitable logic, circuitry and interfaces that may be configured to store and deliver multimedia content to the HMD 102, in response to requests received from the HMD 102 for playback of the multimedia content. Examples of the multimedia content may include, but are not limited to, audio content, video content, animation content, interactive content, VR content, and/or a combination thereof. In accordance with an embodiment, the multimedia content source 104 may be implemented as a server, for example a cloud server, which may be utilized to execute different operations of the multimedia content source 104 through web applications, cloud applications, Hypertext Transfer Protocol (HTTP) requests, repository operations, file transfer, gaming operations, and the like. Other examples of the server include, but are not limited to a database server, a file server, a web server, an application server, a mainframe server, a cloud server, or other types of server. In accordance with an embodiment, the multimedia content source 104 may be a set top box, a live content streaming device, or a broadcast station.

In accordance with an embodiment, the multimedia content source 104 may be a personal media device that may deliver the multimedia content to the HMD 102, via the communication network 106. Examples of the personal media device may include, but are not limited to, a smartphone, a music player, a video player, a laptop, a personal computer, a personal external storage, and a flash drive.

The communication network 106 may include a communication medium through which the HMD 102 may be communicatively coupled to the multimedia content source 104 and the electronic device 108. Examples of the communication network 106 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The electronic device 108 may comprise suitable logic, circuitry and interfaces that may be configured to execute different playback functions of the HMD 102, in response to different instructions received from the HMD 102, based on different user inputs. The electronic device 108 may be configured to receive the multimedia content from the HMD 102, via the communication network 106 and may be further configured to generate an audible output, a visual output, or an audio-visual (AV) output of the multimedia content. The electronic device 108 may be communicatively coupled to the HMD 102, via a wired or a wireless network. Examples of the electronic device may include, but are not limited to, a loudspeaker, a woofer, a sub-woofer, tweeters, a wireless speaker, a sound bar, an audio-video (A/V) reproduction apparatus, a television (TV), a mobile phone, or other electronic devices with a capability to reproduce the multimedia content.

In operation, the HMD 102 may be configured to receive, via a plurality of audio capturing devices, an audio input from a source present in the vicinity of the HMD 102. The reception of the audio input may be based on a sensitivity of the plurality of audio capturing device. The sensitivity may be defined as a ratio of output audio (analog or digital) from the plurality of audio capturing devices to an input pressure (in Pascal (Pa) that corresponds to the audio input. In accordance with an embodiment, the plurality of audio capturing devices may be integrated with (or may be part of) the HMD 102.

The audio source may be the user 110, who may be a wearer of the HMD 102, a blocked user (or an unauthorized user), a natural speaker, or other acoustic sources in the environment ambient to the HMD 102. Additionally, in some cases, the audio input may include babble noise from different babble noise sources, which may be filtered by the HMD 102 to prevent erroneous detection of babble noise as a user input.

The HMD 102 may be configured to determine a location of a source of the received audio input based on properties and/or characteristics of the received audio input. The HMD 102 may be further configured to determine the location of the source, based on detection of at least one of a sound strength of the received audio input, a direction of incidence of the received audio input, or an angle of arrival of the received audio input. The determination of the location of the source of the received audio input is described in detail, for example, in FIGS. 3A and 3B.

The HMD 102 may be further configured to determine whether the received audio input is enunciated by the user 110 (as the wearer of the HMD 102) in a worn state of the HMD 102, based on the determined location of the source of the received audio input. The worn state may indicate that the HMD 102 is worn by a user, such as the user 110. In accordance with an embodiment, the HMD 102 may be configured to determine a distance between the source and the HMD 102, based on the received audio input. The HMD 102 may be further configured to determine whether the received audio input is enunciated from the user 110 (as the wearer of the HMD 102) in the worn state, based on the determination that the distance is equal to or less than a threshold value. The HMD 102 may be further configured to control a function of the HMD 102 based on the determination that the received audio input is enunciated from the user 110 (as the wearer of the HMD 102).

Examples of different functions of the HMD 102 may include, but are not limited to, media playback functions, such as a start function, a terminate function, a pause function, a switching function, a volume control function, and a mode switching function, a function associated with a request to retrieve the multimedia content from the multimedia content source 104, or a function to play a particular sound via the speaker. Alternatively stated, the media playback control functions may include a function to play the multimedia content via the in-build speaker in the HMD 102, a function to terminate the playback of the multimedia content. Also, the media playback control functions may include a function to pause the playback of the multimedia content, a function to switch the playback of the multimedia content to another multimedia content, a function to switch from one mode (such as a noise cancellation mode) to another mode (such as ambient noise mode), and a function to increase/decrease volume of the playback output of the multimedia content.

In accordance with an embodiment, the HMD 102 may be configured to determine that the received audio input is enunciated from a person other than the user 110. The HMD 102 may be configured to store suitable rules (and or control instructions) to control the HMD 102 to react differently in different cases when the received audio input is determined to be enunciated from a person other than the user 110. In one such case, the HMD 102 may be configured to discard the received audio input based on the determination that the received audio input is enunciated from a person other than the user 110. In other cases, as an example, the HMD 102 may be configured to alert (or inform), via the speakers or the display screen of the HMD 102, the user 110 about a possible attempt by an unauthorized user to control the HMD 102. The HMD 102 may be configured to continue with a current function (or a function desired by the user 110) and avoid interruptions in a viewing experience of the user 110. Thus, the disclosed HMD 102 delivers seamless and distraction-free experience while the HMD 102 renders different functions for the user 110, where the user 110 acts as the wearer of the HMD 102.

Figure 2:
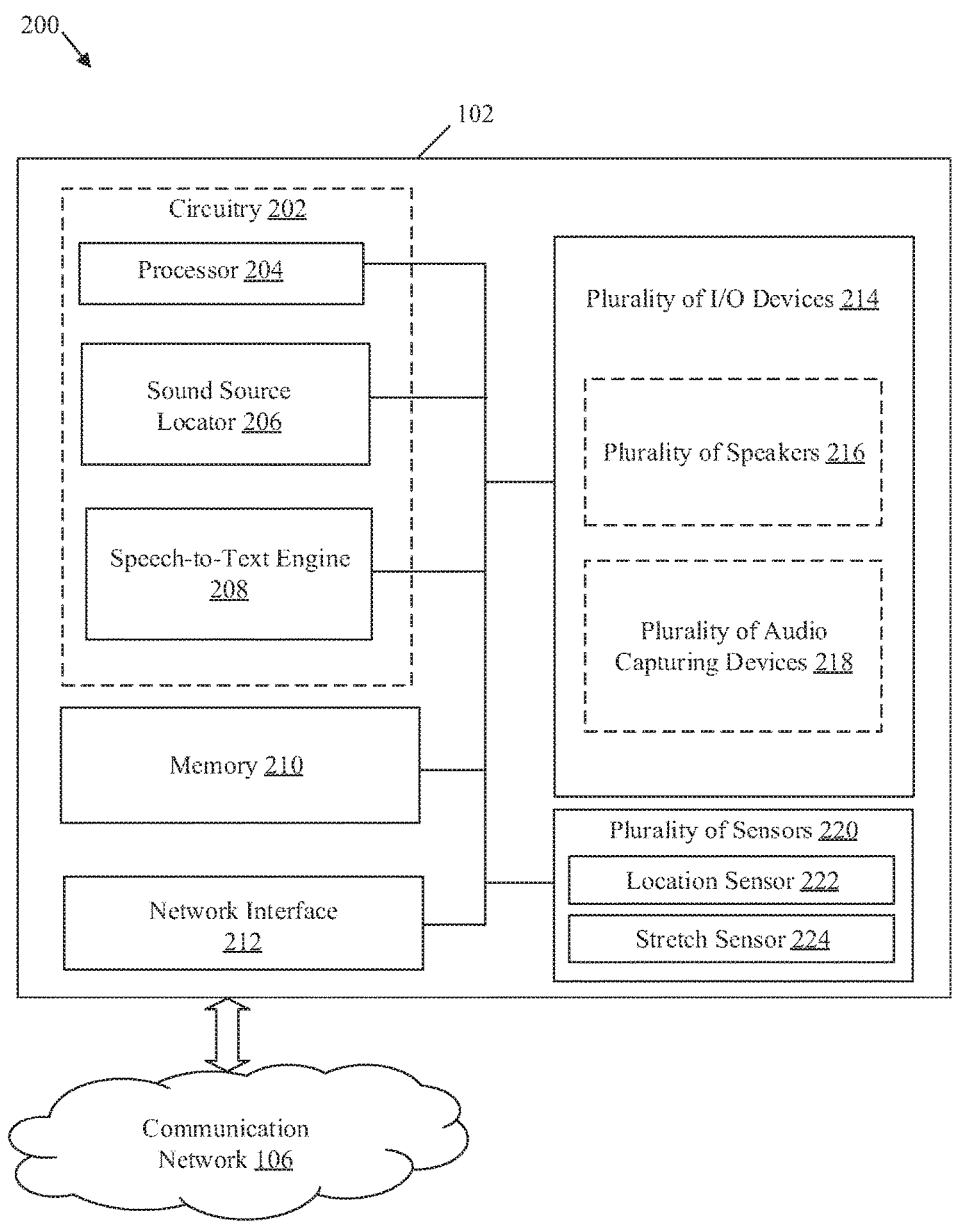
FIG. 2 is a block diagram that illustrates an exemplary HMD of FIG. 1, in accordance with an embodiment of the disclosure.

FIG. 2 is a block diagram that illustrates an exemplary HMD of FIG. 1, in accordance with an embodiment of the disclosure. FIG. 2 is explained in conjunction with elements from FIG. 1. With reference to FIG. 2, there is shown a block diagram 200 of the HMD 102 of FIG. 1. The HMD 102 may include circuitry 202, which may include a processor 204, a sound source locator 206, and a speech-to-text engine 208. The HMD 102 may further include a memory 210, a network interface 212, a plurality of Input/output (I/O) devices 214, and a plurality of sensors 220. The plurality of I/O devices 214 may include a plurality of speakers 216 and a plurality of audio capturing devices 218. The plurality of sensors 220 may include a location sensor 222 and a stretch sensor 224. The circuitry 202 may be communicatively coupled with the memory 210, the network interface 212, the plurality of I/O devices 214, and the plurality of sensors 220, via a set of communication ports/channels or a channel bus.

The processor 204 may comprise suitable logic, circuitry, and interfaces that may be configured to execute a set of instructions stored in the memory 210. The processor 204 may be configured to receive, via the plurality of audio capturing device 218, a user input that corresponds to an audio input (i.e. a voice input) from the user 110. The audio input may be a voice command that may correspond to a specific function of the HMD 102. In certain embodiments, the user input may correspond to an input other than a voice input (or an audio input) from the user 110. Examples of such user input may include, but are not limited to, a twitch input, a gesture input, a physical tap, a bio-signal (e.g., electroencephalogram (EEG) or electrocardiogram (ECG) signal from user's body), a haptic input, and a flutter input. The processor 204 may be further configured to determine whether that the received audio input is enunciated from the user 110 (who also wears the HMD 102) in a worn state of the HMD 102. The processor 204 may be further configured to control a function of the HMD 102 based on the determination that the received audio input is enunciated from the user 110 (as the wearer). The processor 204 may be further configured to control operations associated with the memory 210, network interface 212, the plurality of I/O devices 214, and the plurality of sensors 220, based on different functions in the HMD 102. The processor 204 may be implemented based on a number of processor technologies known in the art. Examples of the processor 204 may include, but are not limited to, a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The sound source locator 206 may comprise suitable logic, circuitry, and/or interfaces that may be configured to determine a location of a source of the received audio input, based on the received audio input. The sound source locator 206 may be further configured to detect at least one of a sound strength of the received audio input, a direction of incidence of the received audio input, or an angle of arrival of the received audio input. The sound source locator 206 may be further configured to determine the location of the source and/or a distance between the source and the HMD 102 based on at least one of the detected sound strength, the detected direction of incidence, or the detected angle of arrival. In accordance with an embodiment, the sound source locator 206 may be configured to control the plurality of audio capturing devices 218, to determine the location of the source of the received audio input. Alternatively, in some cases, the sound source locator 206 may be configured to control the plurality of audio capturing devices 218 to determine a location of one or more sources, where one of the one or more sources may be a wearer of the HMD 102 and remaining sources may be different voice input sources in the ambient environment. Examples of implementations of the sound source locator 206 may include, but are not limited to, a GPU, a RISC processor, an ASIC processor, a CISC processor, a microcontroller, a CPU, or other control circuits.

The speech-to-text engine 208 may comprise suitable logic, circuitry, and/or interfaces that may be configured to convert the received audio input (as a voice command) to a text form or an executable form in which a voice command may be identified from preset commands for specific functions of the HMD 102. The output from the speech-to-text engine may be received by the processor 204, to identify a set of executable instructions specified in the voice command in the text form or the executable form. Examples of implementations of the speech-to-text engine 208 may include, but are not limited to, a dedicated speech-to-text (System on Chip) SoC chip, a GPU, a RISC processor, an ASIC processor, a CISC processor, a microcontroller, a CPU, or other control circuits.

The memory 210 may comprise suitable logic, circuitry, and interfaces that may be configured to store a set of instructions executable by the processor 204, the sound source locator 206, or the speech-to-text engine 208. The memory 210 may be further configured to store a plurality of keywords, a plurality of phrases, and a plurality of sound patterns, which may correspond to the audio input received from the user 110. In some embodiments, the memory 210 may be configured to store a list of blocked users and a voice signature for each of the blocked users. In some embodiments, the memory 210 may be configured to store the multimedia content that may be selected by the user 110 for playback via the plurality of speakers 216. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, a flash memory, or a Secure Digital (SD) card.

The network interface 212 may comprise suitable logic, circuitry, and interfaces that may be configured to establish a communication between the HMD 102, the multimedia content source 104, and the electronic device 108, via the communication network 106. In accordance with an embodiment, the network interface 212 may be configured to transmit a content request to the multimedia content source 104, based on a control signal received from the processor 204. The network interface 212 may be further configured to receive and distribute the multimedia content from the multimedia content source 104 to different components of the HMD 102 and/or the electronic device 108 (e.g., external speakers), based on the transmitted content request. The network interface 212 may be implemented by use of various known technologies to support wired or wireless communication of the HMD 102 with the communication network 106. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

The plurality of I/O devices 214 may comprise suitable logic, circuitry, and interfaces that may be configured to act as an I/O channel/interface between the user 110 or different audio sources and the different operational components of the HMD 102. The plurality of I/O devices 214 may be configured to receive the user input, which may correspond to an audio input, from a source, via the plurality of audio capturing devices 218. In certain embodiments, the user input may correspond to an input other than a voice input from the user 110. The plurality of I/O devices 214 may include various input and output ports to connect various other I/O devices that may communicate with different operational components of the HMD 102. Examples of an input device of the plurality of I/O devices 214 may include, but are not limited to, a microphone (or a microphone array), a keypad, a touch screen, a set of physical buttons, a gesture controller, and an image-capture device. Examples of an output device of the plurality of I/O devices 214 may include, but are not limited to, a display screen, a speaker of the plurality of speakers 216, and a haptic or any sensory output device.

The plurality of speakers 216 may comprise suitable logic, circuitry, interfaces that may be configured to play different sounds (i.e. output acoustic signals) based on controlled playback of audio content stored (or retrieved from the multimedia content source 104) as part of multimedia content in the HMD 102. Examples of plurality of speakers 216 may include, but are not limited to, a loudspeaker, a mini-speaker, an ear speaker, and/or monitor speaker.

The plurality of audio capturing devices 218 may comprise suitable logic, circuitry, interfaces that may be configured to receive an audio input from the user 110 or from different audio sources. The plurality of audio capturing devices 218 may be configured to communicate the received audio input to the sound source locator 206 and the speech-to-text engine 208 for determination of a location of the source of the audio input and a corresponding voice command specified in the audio input. Examples of the plurality of audio capturing devices 218 may include, but are not limited to, an electret microphone, a dynamic microphone, a carbon microphone, a piezoelectric microphone, a fiber microphone, a (micro-electro-mechanical-systems) MEMS microphone, or other microphone known in the art.

The plurality of sensors 220 may comprise suitable logic, circuitry, interfaces, and/or code that may be configured to detect different parameters related to the HMD 102. Examples of such parameters may include, but are not limited to, a geo-location of the HMD 102, an orientation of the HMD 102, an extent of outstretch of a headband (or head-plate) of the HMD 102, an extension in length of headband to fit the headband on the user's head, and/or an object in proximity to the HMD 102. The plurality of sensors 220 may be configured to communicate the detected parameters to the processor 204 and the sound source locator 206. Examples of the plurality of sensors 220 may include, but are not limited to, the location sensor 222, an orientation sensor, an accelerometer, a gyro sensor, the stretch sensor 224 (e.g., a flex sensor), a twist sensor, and/or a proximity sensor.

The location sensor 222 may comprise suitable logic, circuitry, interfaces, and/or code that may be configured to detect a geo-location of the HMD 102. Examples of the location sensor 222 may include a global positioning system (GPS) sensor, a Global Navigation Satellite System (GNSS)-based sensor, a position sensor based on a Hall Effect sensor, or other regional navigation systems or sensors.

The stretch sensor 224 may comprise suitable logic, circuitry, interfaces, and/or code that may be configured to detect an extent of outstretch of the HMD 102 and generate an electric signal based on the detected extent of outstretch of the HMD 102. Examples of the stretch sensor 224 may include, but are not limited to, a bend sensor, a flex sensor, or a tilt sensor.

The functions or operations executed by the HMD 102, as described in FIG. 1, may be performed by the circuitry 202, the processor 204, the sound source locator 206, the speech-to-text engine 208, the plurality of I/O devices 214, and the plurality of sensors 220. The operations executed by the processor 204, the sound source locator 206, the plurality of I/O devices 214, and the plurality of sensors 220 are further described in detail, for example, in FIGS. 3A, 3B, 4A, 4B, and 5.

Figure 3A:
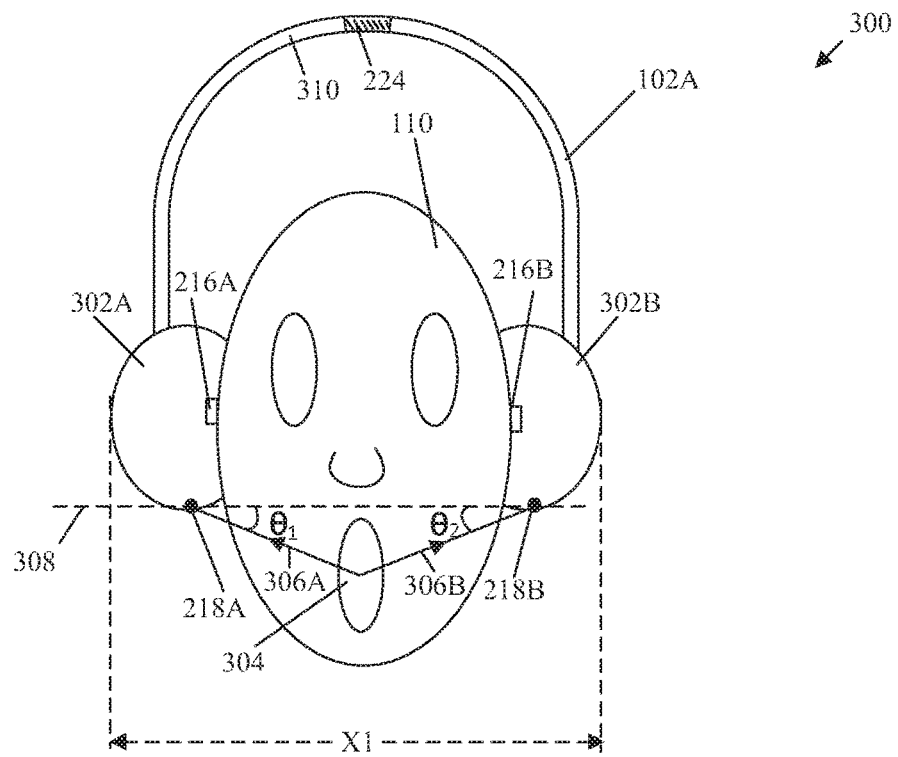
FIGS. 3A and 3B, collectively, illustrate a first exemplary scenario for control of the HMD of FIG. 2, based on wearer information and user inputs, in accordance with an embodiment of the disclosure.
Figure 3B:
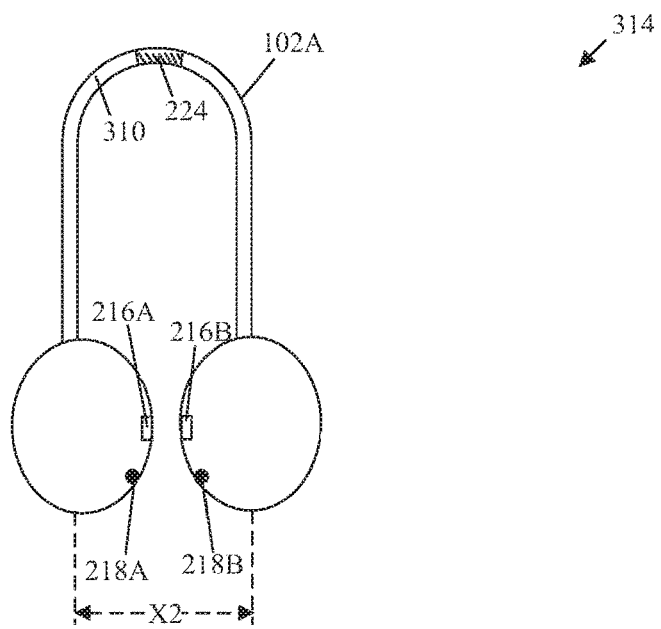

FIGS. 3A and 3B collectively, illustrate a first exemplary scenario for control of the HMD 102 of FIG. 2, based on wearer information and user inputs, in accordance with an embodiment of the disclosure. FIGS. 3A and 3B are explained in conjunction with elements from FIGS. 1 and 2. With reference to FIG. 3A, there is shown a first exemplary scenario, where the HMD 102 may be in a first state 300, which may correspond to a worn state, where the HMD 102 is worn by the user 110. Also, there may be a second state 314 of the HMD 102, in which the HMD 102 may not be worn by the user 110. The second state 314 is described in detail in FIG. 3B.

The HMD 102 may include a first ear-cup 302A and a second ear-cup 302B. The first ear-cup 302A may enclose a first speaker 216A of the plurality of speakers 216 and a first audio capturing device 218A of the plurality of audio capturing devices 218. The second ear-cup 302B may enclose a second speaker 216B of the plurality of speakers 216 and a second audio capturing device 218B of the plurality of audio capturing devices 218. In accordance with an embodiment, each of the first audio capturing device 218A and the second audio capturing device 218B may include an array of audio capturing devices. The HMD 102 may further include a headband 310 that couples and holds apart the first ear-cup 302A and the second ear-cup 302B.

In the worn state of the HMD 102, the HMD 102 may be configured to receive an audio input from the user 110 through the first audio capturing device 218A and the second audio capturing device 218B. The audio input may correspond to an acoustic signal generated from the vocal tract of user's mouth 304, i.e. the source of the audio input. In accordance with an embodiment, the audio source may be the user 110 who may be a wearer of the HMD 102, a blocked user (or an unauthorized user), a natural speaker, or other acoustic sources in the environment ambient to the HMD 102. Additionally, in some cases, the audio input may include babble noise from different babble noise sources, which may be filtered by the HMD 102 to prevent erroneous detection of babble noise as a user input.

The reception of the audio input by the first audio capturing device 218A may be represented by a first straight line 306A between the mouth 304 of the user 110 and the first audio capturing device 218A. Similarly, the reception of the audio input by the second audio capturing device 218B may be represented by a second straight line 306B between the mouth 304 and the second audio capturing device 218B. The first straight line 306A and the second straight line 306B may represent a dominant direction of arrival (DOA) of the audio input, i.e. a first direction of incidence of the audio input and a second direction of incidence of the audio input, respectively.

In FIG. 3A, there is also shown an imaginary axis 308 that crosses through the first audio capturing device 218A and the second audio capturing device 218B. Further, there is shown a first angle of arrival "$\theta_1$" of the audio input between the imaginary axis 308 and the first straight line 306A, in case the audio input is enunciated by the user 110 (as the wearer of the HMD 102). Similarly, there is also shown a second angle of arrival "$\theta_2$" of the audio input between the imaginary axis 308 and the second straight line 306B, in case the audio input is enunciated by the user 110 (as the wearer of the HMD 102). The first angle of arrival "$\theta_1$", the second angle of arrival "$\theta_2$", the first direction of incidence, and the second direction of incidence of the audio input may vary in case the audio input is not enunciated by the user 112.

The first audio capturing device 218A and the second audio capturing device 218B may be configured to receive the audio input and communicate an equivalent of the audio input as a first electric signal and a second electric signal to the sound source locator 206, respectively. The sound source locator 206 may include a sound card, through which the first electric signal and the second electric signal may be converted to a digital audio input, i.e. a first digital signal and a second digital signal. The sound source locator 206 may be configured to determine the first angle of arrival "$\theta_1$", the second angle of arrival "$\theta_2$", the first direction of incidence (represented by the first straight line 306A), and the second direction of incidence (represented by the second straight line 306B) based on the digital audio input, i.e. the first digital signal and the second digital signal.

The sound source locator 206 may be further configured to determine a sound strength of the audio input, in decibels (dB), based on the first digital signal and the second digital signal corresponding to the first audio capturing device 218A and the second audio capturing device 218B, respectively. In some embodiments, as sound strength of different sources may vary, the sound source locator 206 may be configured to apply audio normalization to the received audio input in order to bring gain of the received audio input within a specific range. With audio normalization, different loud and weak sound sources may have comparable gain values. The sound source locator 206 may be further configured to determine a location of the source of the audio input based on the determined sound strength, the first angle of arrival "$\theta_1$", the second angle of arrival "$\theta_2$", the first direction of incidence (represented by the first straight line 306A), the second direction of incidence, or a combination thereof.

In accordance with an embodiment, the sound source locator 206 may be further configured to determine the source of the audio input as the user 110 (or the wearer), based on the determined location of the source. Thus, the sound source locator 206 may be configured to determine that the received audio input is enunciated from the user 110 in the worn state of the HMD 102, based on the location of the source of the received audio input. In accordance with an embodiment, in order to precisely determine the source of audio input, the sound source locator 206 may be further configured to estimate an echo component in the received audio input and cancel the echo (caused by multi-path reflections) to get a voice input from a dominant direction that may represent the source path for the audio input. The estimation and cancellation of echo component may be done by a noise cancellation technique, for example, adaptive noise cancellation (ANC). The description of ANC may be known to one skilled in the art and therefore, details of ANC has been omitted from the disclosure for the sake of brevity.

In accordance with an embodiment, the sound source locator 206 may be configured to compare the determined sound strength, the first angle of arrival "$\theta_1$", the second angle of arrival "$\theta_2$", the first direction of incidence, the second direction of incidence with a plurality of threshold values stored in the memory 210. The sound source locator 206 may be configured to determine the location of the source of the audio input based on the comparison. For example, in case the sound strength (in dB) of the audio input is greater than or equal to a threshold value of the plurality of threshold values, the location of the source of the audio input may be determined to be close to the first audio capturing device 218A and the second audio capturing device 218B. The location of the source may be the mouth 304 of the user 110 (as the wearer) of the HMD 102 and may further indicate that the location of the source of the audio input is within a threshold range from location of the HMD 102 in three-dimensional (3D) space. In case the audio input is received from the person (who is not wearing the HMD 102), the sound strength (in dB) of the audio input may decrease and the location of the source of the audio input may be determined to be far from the first audio capturing device 218A and the second audio capturing device 218B.

The sound source locator 206 may be further configured to compare the first angle of arrival "$\theta_1$" and the second angle of arrival "$\theta_2$" with a threshold angle value of the plurality of threshold values, to determine a location of the source of the audio input as the mouth 304 of the user 110. For example, in case both the first angle of arrival "$\theta_1$" and the second angle of arrival "$\theta_2$" are equal, the source of the audio input may be determined to be present in-between the positions of the first audio capturing device 218A and the second audio capturing device 218B. The in-between positions may be correspond to a position of the mouth 304 of the user 110 (who wears the HMD 102).

In accordance with an embodiment, the sound source locator 206 may be configured to determine whether both the first angle of arrival "$\theta_1$" and the second angle of arrival "$\theta_2$" are acute angles. Also, it may be determined whether both the first angle of arrival "$\theta_1$" and the second angle of arrival "$\theta_2$" are equal to or less than the threshold angle value stored in the memory 210. In such a case, the sound source locator 206 may determine the source of the audio input as the mouth 304 of the user 110. In a scenario where one of the first angle of arrival "$\theta_1$" or the second angle of arrival "$\theta_2$" is an obtuse angle and greater than the threshold angle value stored in the memory 210, it may indicate that the audio input is received from a person or an audio source different from the user 110 (as the wearer).

In accordance with an embodiment, the sound source locator 206 may be further configured to compare the first direction of incidence (represented by the first straight line 306A) and the second direction of incidence (represented by the second straight line 306B) with a threshold direction value of the plurality of threshold values, to determine a location of the source of the audio input. The combination of the comparisons with respect to the threshold sound value, the threshold angle value, and the threshold direction value may ensure an accurate estimation of the location of the source of the audio input. The HMD 102 may be configured to accurately determine whether the received audio input is enunciated by the user 110 as the wearer of the HMD 102 in the worn state or from the person (who is not wearing the HMD 102) based on the determined location of the source of the received audio input.

In accordance with an embodiment, the sound source locator 206 may be configured to determine a distance between the location of the source and the HMD 102 based on one or more of the determined sound strength (in dB), the first angle of arrival "$\theta_1$", the second angle of arrival "$\theta_2$", the first direction of incidence, and the second direction of incidence of the received audio input. Also, the sound source locator 206 may be configured to determine the distance between the location of the source, the first audio capturing device 218A, and the second audio capturing device 218B.

The sound source locator 206 may be further configured to compare the determined distance with a threshold distance value of the plurality of threshold values. The sound source locator 206 may be configured to determine that the received audio input is enunciated from the mouth 304 of the user 110 in the worn state, based on the comparison between the determine distance and the threshold distance. For example, in case, the determined distance is less than or equal to the threshold distance, the location of the source of the audio input may be determined to be closer to the first audio capturing device 218A and the second audio capturing device 218B. In case the audio input is received from the person (who is not wearing the HMD 102), the determined distance may be greater than the threshold distance and the location of the source of the audio input may be determined to be far from the first audio capturing device 218A and the second audio capturing device 218B.

The determined parameters (i.e. sound strength, angle of arrival, and direction of incidence) for the audio input should satisfy the comparisons done with respect to the threshold sound value, the threshold angle value, and the threshold direction value. This may be done to robustly determine whether the audio input is received from the wearer of the HMD 102, a natural human speaker, or other audio sources ambient to the HMD 102. In accordance with an embodiment, the processor 204 may be configured to discard the voice command in the received voice input. The voice command corresponding to the audio input may be discarded based on the determination that the received audio input is enunciated from a person (who is not wearing the HMD 102), other audio sources, or babble noise sources in the ambient environment.

The processor 204 may be configured to control a function of the HMD 102, based on the determination that the received audio input is enunciated from the user 110 (as the wearer) in the worn state of the HMD 102. In such a case, the processor 204 may be configured to control the function of the HMD 102, based on the voice command specified in the received audio input. The control of a function of the HMD 102 may correspond to a voice command to start, terminate, or pause a playback of the multimedia content. The control of a function of the HMD 102 may further correspond to a command to switch playback of current multimedia content to another multimedia content, a command to switch from a noise cancellation mode to an ambient noise mode of the HMD 102. Herein, the noise cancellation mode may correspond to a mode where ambient noise (e.g., white noise, babble noise, echo, etc.) may be cancelled by the HMD 102. Similarly, the ambient noise mode may correspond to a mode where the ambient noise may not be cancelled from mixing with the speaker output.

The control of a function of the HMD 102 may further correspond to a command to increase or decrease volume of the playback or a command to play of particular sound via the plurality of speakers 216. The control of a function of the HMD 102 may further correspond to a command to change screen tabs of running applications and a command to switch between gameplay windows and/or other application windows active in the HMD 102.

In accordance with an embodiment, based on the determination that the received audio input is enunciated from the user 110 (as the wearer) in the worn state, the processor 204 may be further configured to control a function of the HMD 102 to transmit a request (via the communication network 106) to the multimedia content source 104 for multimedia content. The processor 204 may be further configured to receive, from the multimedia content source 104, the multimedia content in response to the transmitted request. The processor 204 may be further configured to output or control playback of the received multimedia content via the plurality of speakers 216.

In accordance with an embodiment, based on the determination that the received audio input is enunciated from the user 110 (as the wearer) in the worn state, the processor 204 may be configured to control the speech-to-text engine 208 to convert the received audio input (which includes the voice command) to the text form or in the form which may executable or understandable by the processor 204. The processor 204 may be configured to receive the voice command from the speech-to-text engine 208 and identify the function of the HMD 102 to be controlled based on the voice command received from the user 112 (who may be the wearer of the HMD 102).

For example, the user 110 (as the wearer of the HMD 102) may wish to listen to a particular song. A voice command may be received from the user 110 as an audio input, such as "please play XYZ song". The processor 204, based on the determination that the received audio input is enunciated from the user 110 (as the wearer), may be configured to control the speech-to-text engine 208 to convert the received audio input to a voice command (in text form or executable form). The processor 204 may be further configured to recognize the voice command based on the text form and may further search a database for voice command representations stored in the memory 210 for the requested XYZ song. The database of voice command representations may include a curated library of voice samples from one or more users (e.g., the user 110) mapped to different types of functions, media content, and/or requests associated with the HMD 102. In case the XYZ song is not available in the memory 210, the processor 204 may be configured to transmit the request to the multimedia content source 104 for the XYZ song.

Continuing with the above example, the multimedia content source 104 may be configured to search for the requested XYZ song in a database associated with the multimedia content source 104. The multimedia content source 104 may be configured to transmit the requested XYZ song to the HMD 102, via the communication network 106, based on the search. The processor 204 may be further configured to control the playback of the received XYZ song, via the plurality of speakers 216, based on the received voice command from the user 110 (as the wearer).

In accordance with an embodiment, the memory 210 may be configured to store a plurality of keywords and a plurality of phrases associated with different voice command representations that may be enunciated by the user 110 (or a wearer of the HMD 102). The processor 204 may be configured to compare a text form of the received audio input with the stored plurality of keywords and the plurality of phrases. The processor 204 may be configured to recognize the received voice command based on the comparison and the determination that the voice command is enunciated from the user 110 (as the wearer of the HMD 102). The plurality of keywords and the plurality of phrases may correspond to a set of preset commands associated with the HMD 102. In case the text form of the received audio input matches with the stored plurality of keywords and the plurality of phrases, the processor 204 may be configured to control a function associated with the voice command of the HMD 102. In case there is mismatch between the text form of an audio input with the stored plurality of keywords and the plurality of phrases, the processor 204 may be configured to discard the audio input and the continue with active functions of the HMD 102.

In accordance with an embodiment, the memory 210 may be further configured to store a plurality of sound patterns. The processor 204 may be configured to receive the audio input from the plurality of audio capturing devices 218 and compare the received audio input with the stored plurality of sound patterns. Each sound pattern or a group of sound patterns may be mapped to a corresponding preset voice command in the memory 210. The processor 204 may be configured to recognize the voice command in the audio input based on the comparison. The recognition may indicate that the received voice command is associated with a function of the HMD 102. The processor 204 may be configured to recognize the voice command in the audio input from the user 110 based on the comparison between the received audio input and the stored plurality of sound patterns. The processor 204 may be configured to control a function of the HMD 102 based on the determination that the received audio input is enunciated from the user 110 (as the wearer). Also, the function may be controlled based on the recognition that the received audio input matches with one of the stored plurality of keywords, the plurality of phrases, or the plurality of sound patterns.

In accordance with an embodiment, the HMD 102 may include a stretch sensor 224 affixed to the headband 310 of the HMD 102. The stretch sensor 224 may be configured to detect an extent of outstretch of the headband 310. A sensor reading circuit associated with the stretch sensor 224 may be configured to communicate a digital signal that may indicate an extent of outstretch of the headband 310. The processor 204 may be configured to determine that HMD 102 is in a worn state based on the extent of outstretch of the headband 310 with respect to a default unworn state of the HMD 102. The unworn state may be indicated by a default value from the stretch sensor 224 in the unworn state.

The HMD 102 may also include a sensor that measures change in length of the headband 310 around the head of the user 110, with respect to the default state of the headband 310. The default state may correspond to a compact state where the length of the headband has a zero extension and the length may be adjustable for the headband 310, based on a surface geometry of the head of the user 110. The measure of the extension in the length or bend of the headband 310 may act as a unique identifier for different wearers of HMD 102. Such a measure may be factored by the processor 204 to determine whether the HMD 102 is in the worn state and/or whether the received audio input is enunciated from the user 110 (as the wearer).

In accordance with an embodiment, the processor 204 may be further configured to determine a distance between the first ear-cup 302A and the second ear-cup 302B in order to determine that the HMD 102 is in the worn state. The distance between the first audio capturing device 218A and the second audio capturing device 218B may also be determined to ascertain the worn state of the HMD 102. The determined distance between the first ear-cup 302A and the second ear-cup 302B (represented by "X1" in FIG. 3A) may be greater than a defined threshold distance when the HMD 102 is worn by the user 110 (as a wearer of the HMD 102).

In accordance with an embodiment, the HMD 102 may include a tilt sensor (not shown) or an orientation sensor (not shown) to detect an extent of tilt or an orientation of the HMD 102. The processor 204 may be configured to determine that the HMD 102 is in the worn state based on the detected extent of tilt or the orientation of the HMD 102.

With reference to FIG. 3B, there is shown the second state 314 where the HMD 102 is in an unworn state. The processor 204 may be configured to determine that HMD 102 is in the unworn state based on the extent of outstretch of the headband 310, which may be indicated by a digital signal from the stretch sensor 224. In accordance with an embodiment, the processor 204 may be configured to determine the distance between the first audio capturing device 218A and the second audio capturing device 218B to determine that the HMD 102 is in the unworn state. The determined distance (represented by "X2") may be equal to or less than a defined threshold distance, when the HMD 102 is in the unworn state. The unworn state may also be determined by the processor 204, based on the detection of an extent of tilt or an orientation of the HMD 102.

Although in FIGS. 3A and 3B, the first audio capturing device 218A and the second audio capturing device 218B are shown to be enclosed by the first ear-cup 302A and the second ear-cup 302B, respectively, in a planar arrangement. However, the disclosure may not be so limited and the first audio capturing device 218A and the second audio capturing device 218B may be present in different portions of the HMD 102 in different planar and/or non-planar arrangements, without a deviation from scope of the disclosure.

Figure 4A:
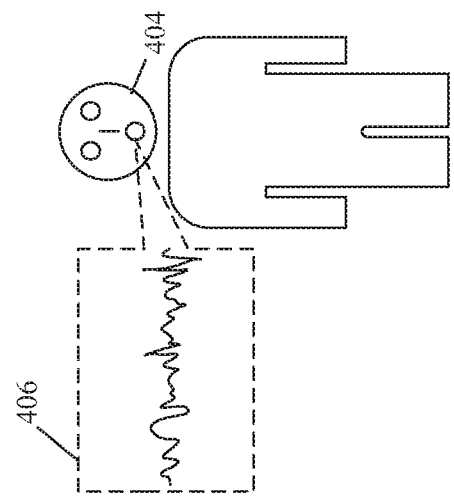
FIGS. 4A and 4B, collectively, illustrate a second exemplary scenario for control of the HMD of FIG. 2, based on wearer information and user inputs, in accordance with an embodiment of the disclosure.
Figure 4A:
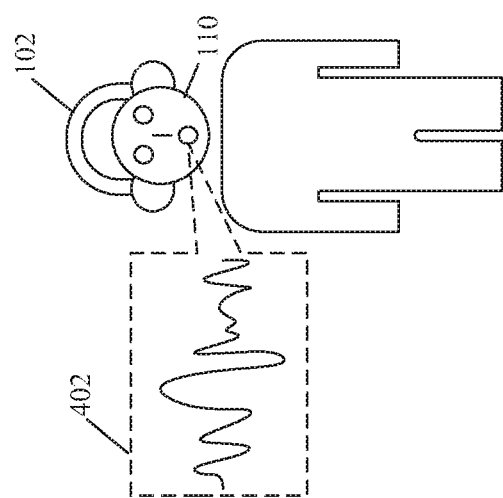
Figure 4B:
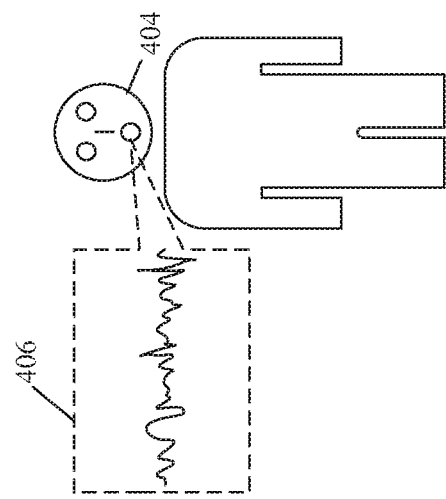
Figure 4B:
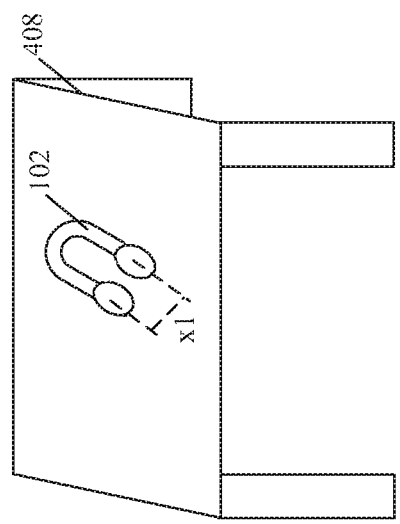

FIGS. 4A and 4B, collectively, illustrate a second exemplary scenario for control of the HMD of FIG. 2, based on wearer information and user inputs, in accordance with an embodiment of the disclosure. FIGS. 4A and 4B are explained in conjunction with elements from FIGS. 1, 2, 3A, and 3B. With reference to FIG. 4A, there is shown a second exemplary scenario, where the user 110 (who is a wearer of the HMD 102) and a user 404 is present in vicinity of the HMD 102. Further, there is shown a first audio input 402 (represented by an audio spectrum) that may be may be enunciated by the user 110 and a second audio input 406 that may be enunciated by the user 404.

In accordance with an embodiment, the plurality of audio capturing devices 218 of the HMD 102 may receive the first audio input 402 enunciated by the user 110. The processor 204 may be configured to control the function of the HMD 102 based on a voice command included in the received first audio input 402, as described in detail, for example, in FIG. 3A. In some embodiments, the plurality of audio capturing devices 218 of the HMD 102 may receive the second audio input 406 enunciated from the user 404. The sound source locator 206 may be configured to determine the location of the source (such as user 404) of the received second audio input 406. Based on the determined location by the sound source locator 206, the processor 204 may be further configured to determine that the received second audio input 406 is from the user 404 who is different from the user 110 (i.e. the wearer of the HMD 102). Accordingly, the processor 204 may be configured to identify the received audio input from the user 404 as an invalid input from the user 404. The processor 204 may be configured to discard the second audio input 406 and thereby, prevent an unauthorized control of different functions of the HMD 102 by the user 404. In accordance with an embodiment, the processor 204 may be configured to discard the received second audio input 406 based on the determination that the location of the source of the second audio input 406 is not within a threshold distance range from the HMD 102. In this way, an undesirable interruption, caused by the audio input (or voice command) from a nearby person (such as the user 404), may be avoided. This may further enhance the overall user experience for the user 110 who wears the HMD 102 and wants to control the functions of the HMD 102 only through his/her voice commands.

With respect to FIG. 4B, there is shown a scenario where the HMD 102 may be placed in an unused state on a table 408 placed in proximity from the user 404. The user 404 may provide the second audio input 406 (includes the voice command) to control the HMD 102. The HMD 102 may be configured to determine the worn state based on various technique described in detail, for example, in FIGS. 3A and 3B. The processor 204 and the sound source locator 206 may be further configured to determine that the second audio input 406 is enunciated from the user 404 and not from the wearer (i.e. an authorized user) of the HMD 102. Thus, the processor 204 may be configured to discard the second audio input 406 and thereby, prevent an unauthorized control of different functions of the HMD 102 by the user 404.

In accordance with an embodiment, the memory 210 may be configured to store a list of blocked users and a first voice signature for each of the blocked users. A blocked user of the list of blocked users may correspond to a user who is not authorized and/or authenticated as a valid user to control the functions of the HMD 102 and the first voice signature may correspond to a voice sample of the blocked user.

In a scenario, the HMD 102 may receive the second audio input 406 as illustrated in FIG. 4B. The processor 204 may be configured to analyze the second audio input 406 and determine a second voice signature of the second audio input 406. The processor 204 may be further configured to compare the determined second voice signature of the second audio input 406 with the stored first voice signatures of each of the blocked users. The processor 204 may be further configured to identify the user 404 (who enunciated the second audio input 406) as a blocked user, in case the second voice signature of the second audio input 406 matches with one of stored first voice signatures of each of the blocked users. The processor 204 may be further configured to discard the second audio input 406 that is enunciated from the identified blocked user 404.

In accordance with an embodiment, the processor may be configured to analyze first audio input 402 enunciated from the user 110 (who wears the HMD 102) and determine a third voice signature from the first audio input 402. The processor 204 may be further configured to compare the determined third voice signature of the first audio input 402 with the stored first voice signatures of each of the blocked users. The processor 204 may be further configured to identify the user 110 (who is wearing the HMD 102) as the blocked user, in case the third voice signature of the first audio input 402 matches with one of stored first voice signatures of each of the blocked users. In such a case, the processor 204 may be further configured to discard the first audio input 402 that is enunciated from the user 110, even though the HMD 102 may be worn by the user 110.

Figure 5:
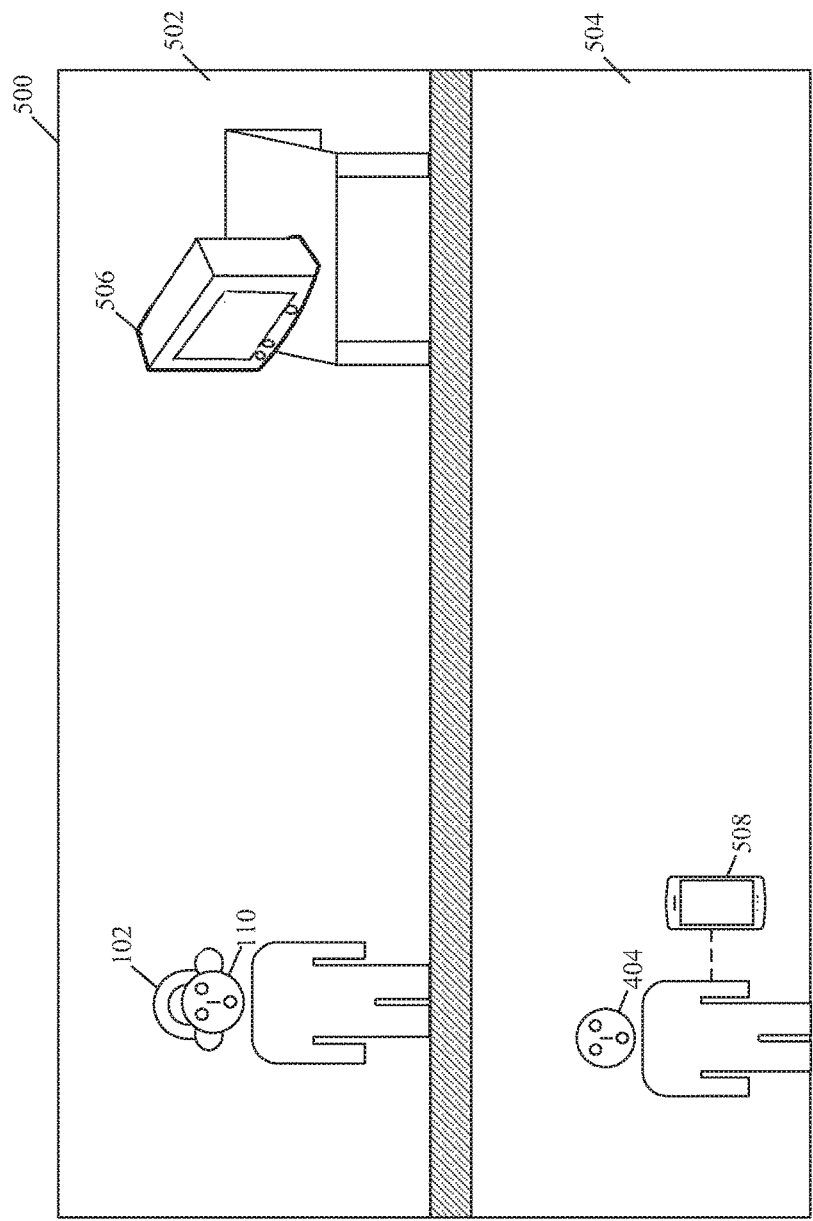
FIG. 5 is a third exemplary scenario that illustrates a communication between the HMD of FIG. 2 and an electronic device of FIG. 1, in accordance with an embodiment of the disclosure.

FIG. 5 is a third exemplary scenario that illustrates a communication between the HMD of FIG. 2 and an electronic device of FIG. 1, in accordance with an embodiment of the disclosure. FIG. 5 is explained in conjunction with elements from FIGS. 1, 2, 3A, 3B, 4A, and 4B. With reference to FIG. 5, there is shown a third exemplary scenario. In the third exemplary scenario, there is shown a home environment 500, in which the user 110 (who wears the HMD 102) may be present in a first room 502. The first room 502 may also include a first electronic device 506 (such as a TV). There is also shown the user 404 and a second electronic device 508 (such as a mobile phone) associated with the user 404 in a second room 504 of the home environment 500. The first electronic device 506 and the second electronic device 508 may be similar to the electronic device 108 of FIG. 1.

In accordance with an embodiment, the HMD 102 and the first electronic device 506 may be communicatively coupled via the communication network 106. In such a scenario, when the user 110 wants to consume the multimedia content through the first electronic device 506 instead of the HMD 102, the first audio input 402 that includes a first voice command may be enunciated by the user 110, to connect the HMD 102 with first electronic device 506. The processor 204 may be configured to connect (or pair) the HMD 102 to the first electronic device 506, based on the first audio input 402. The first audio input 402 may include a second voice command to transfer the multimedia content from the HMD 102 to the first electronic device 506. The processor 204 may be further configured to transfer the multimedia content from the HMD 102 to the first electronic device 506, based on the first audio input 402.

In accordance with an embodiment, the processor 204 may be configured to connect the HMD 102 with the first electronic device 506 and transfer the multimedia content from the HMD 102 to the first electronic device 506, based on the determination that the received first audio input 402 is enunciated from the user 110 (who is also a wearer of the HMD 102). The processor 204 may be further configured to connect the HMD 102 with the second electronic device 508 (such as the mobile phone) to execute various functions of the HMD 102 on the second electronic device 508. Examples of such functions may include, but are not limited to, a telephonic call, a video conference call, a transmission of message, or a connection with an internet network or with the multimedia content source 104.

In certain scenario, the user 404 in the second room 504 may want to locate the HMD 102. In such scenarios, the second electronic device 508 associated with the user 404 may transmit a location signal, which may indicate a first geo-location of the user 404, to the HMD 102. Further, the processor 204 may be configured to track a second geo-location of the HMD 102 by the location sensor (such as GPS sensor) of the HMD 102. A distance may be determined, by the processor 204, between the second electronic device 508 and the HMD 102, based on the received first geo-location of the second electronic device 508 and the tracked second geo-location of the HMD 102. In response to the determination of the distance, the processor 204 may be further configured to output a sound signal via the plurality of speakers 216, where an intensity of the sound signal may depend on the determined distance. A level of intensity of the sound signal may be directly proportional to the distance between the second electronic device 508 and the HMD 102. The sound signal may facilitate the user 404 in the second room 504 to locate the HMD 102.

In response to the determination of the distance, the processor 204 may be further configured to transmit information related to the second geo-location of the HMD 102 to the second electronic device 508. The information may indicate a path from the first geo-location of the second electronic device 508 to the first geo-location of the HMD 102. The information may also include navigation information of the home environment 500.

Figure 6A:
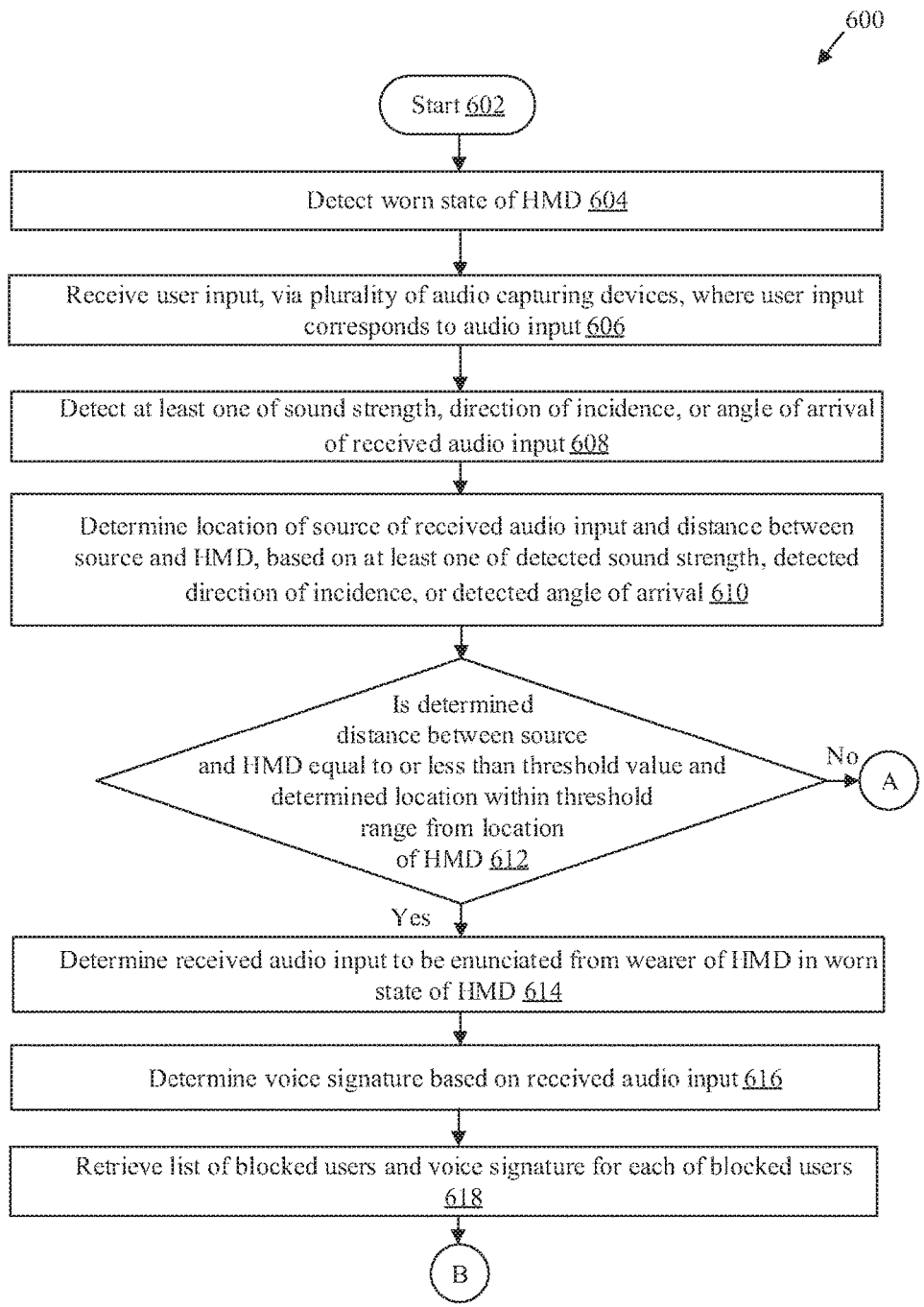
FIGS. 6A, 6B, and 6C, collectively, depict a flowchart that illustrates exemplary operations for control of the HMD based on wearer information and user inputs, in accordance with an embodiment of the disclosure.
Figure 6B:
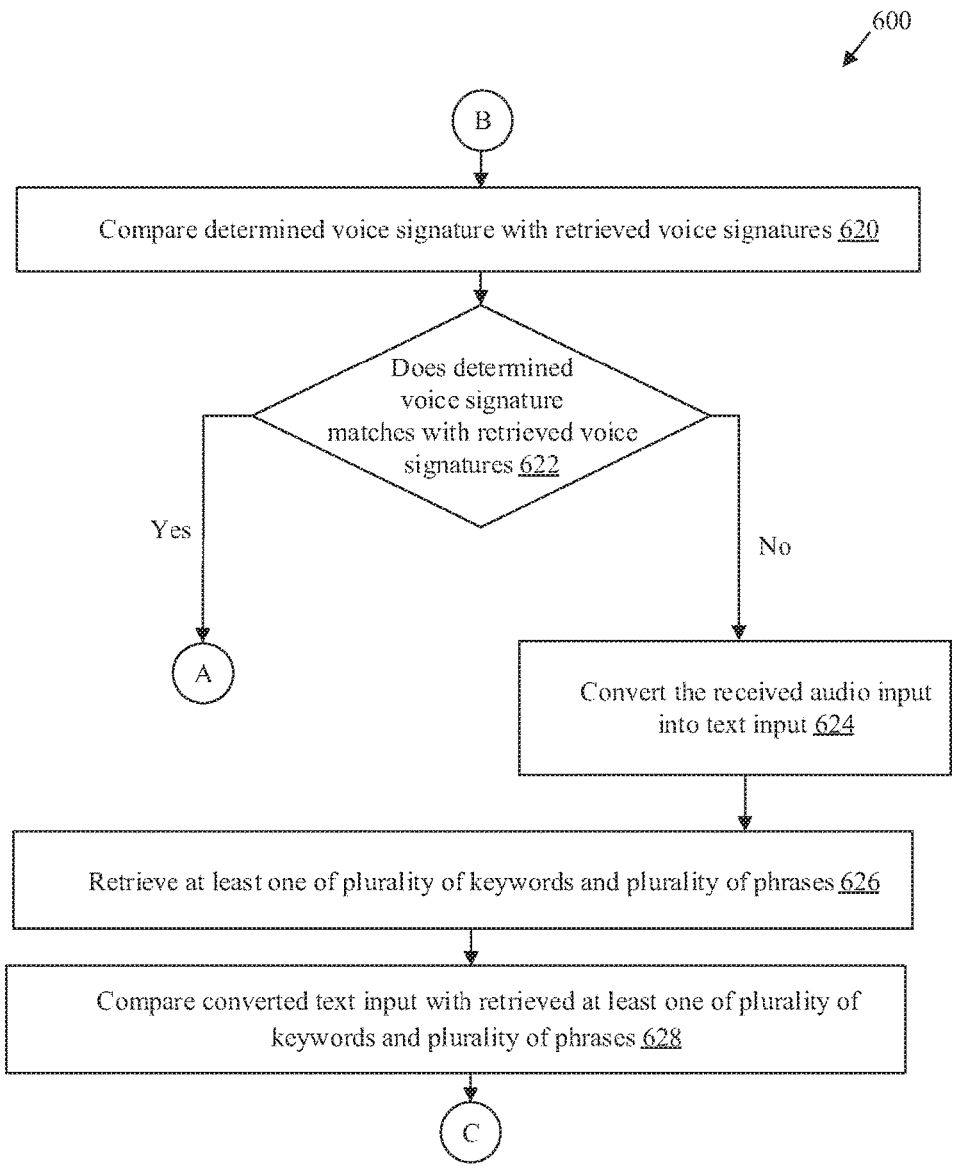
Figure 6C:
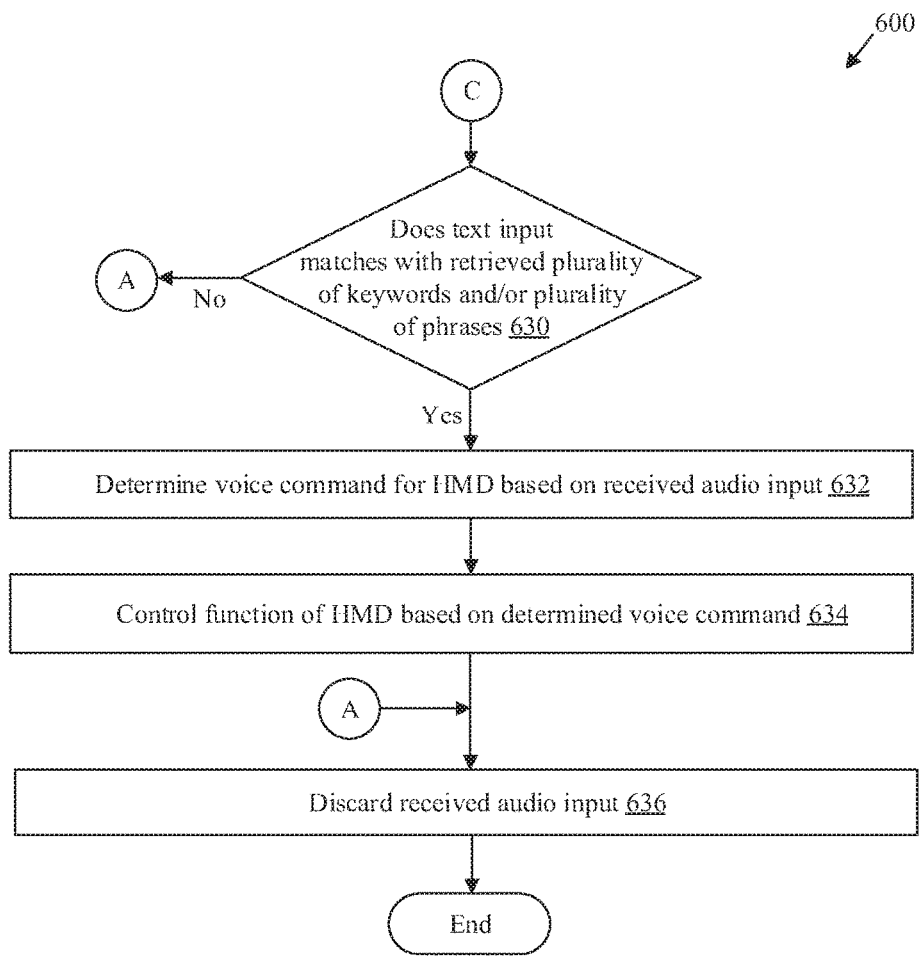

FIGS. 6A, 6B, and 6C, collectively, depict a flowchart that illustrates exemplary operations for control of the HMD of FIG. 2 based on wearer information and user inputs, in accordance with an embodiment of the disclosure. With reference to FIGS. 6A, 6B, and 6C, there is shown a flowchart 600. The flowchart 600 is described in conjunction with FIGS. 1, 2, 3A, 3B, 4A, 4B, and 5. The operations from 602 to 636 may be implemented in the HMD 102. The operations of the flowchart 600 may start at 602 and proceed to 604.

At 604, a worn state of the HMD 102 may be detected. The processor 204 may be configured to detect the worn state of the HMD 102 (i.e. a state where the user 110 wears the HMD 102). The detection of the worn state of the HMD 102 is described in detail, for example, in FIGS. 3A and 3B.

At 606, a user input may be received, via the plurality of audio capturing devices 218, where the user input may correspond to an audio input. The processor 204 may be configured to receive, via the plurality of audio capturing devices 218, the user input, which may be correspond to the audio input. In certain embodiments, the user input may correspond to an input other than a voice input (or an audio input) from the user 110. Examples of such user input may include, but are not limited to, a twitch input, a gesture input, a physical tap, a bio-signal (e.g., electroencephalogram (EEG) or electrocardiogram (ECG) signal from user's body), a haptic input, and a flutter input. The reception of the audio input is described in detail, for example, in FIG. 3A.

At 608, a sound strength, a direction of incidence, or an angle of arrival of the received audio input may be detected. In accordance with an embodiment, the sound source locator 206 of the HMD 102 may be configured to detect the sound strength, the direction of incidence or the angle of arrival of the received audio input as described in detail, for example in FIG. 3A.

At 610, a location of a source of the received audio input and a distance between the source and the HMD 102 may be determined, based on the detected sound strength, the detected direction of incidence and the detected angle of arrival of the received audio input. In accordance with an embodiment, the sound source locator 206 may be configured to determine the location of the source of the received audio input and the distance between the source and the HMD 102 based on the detected sound strength, the detected direction of incidence and the detected angle of arrival of the received audio input as described in detail, for example, in FIG. 3A.

At 612, it may be determined whether the distance between the source of the received audio input and the HMD 102 is equal to or less than a threshold value and the determined location is within a threshold range from a location of the HMD 102. In accordance with an embodiment, the processor 204 may be further configured to determine whether the distance between the source of the received audio input and the HMD 102 is equal to or less than the threshold value and the determined location is within the threshold range from the location of the HMD 102. In cases, where the distance between the source and the HMD 102 is equal to or less than the threshold value, and the determined location of the source of the received audio input is within the threshold range from the location of the HMD 102, control passes to 614. Otherwise, control passes to 636, where the received audio input may be discarded.

At 614, the received audio input is determined to be enunciated from the wearer of the HMD 102 in the worn state of the HMD 102. The processor 204 may be configured to determine that the received audio input is enunciated from the wearer of the HMD 102 in the worn state. The determination may be done based on the determined location of the source of the received audio input and the determined distance between the source and the HMD 102.

At 616, a voice signature may be determined based on the received audio input. In accordance with an embodiment, the processor 204 may be configured to determine the voice signature based on the received audio input.

At 618, a list of blocked users and a voice signature for each of the blocked users may be retrieved. The processor 204 may be further configured to retrieve the list of blocked users and the voice signature for each of the blocked users from the memory 210.

At 620, the determined voice signature and the retrieved voice signatures may be compared. The processor 204 may be configured to compare the determined voice signature of the audio input and the retrieved voice signatures for the blocked users.

At 622, it may be determined whether the determined voice signature matches with the retrieved voice signatures. The processor 204 may be configured to determine whether the determined voice signature of the audio input matches with the retrieved voice signatures of the blocked users. In cases where the determined voice signature matches with the retrieved voice signatures of the blocked users, control passes to 636, where the received audio input may be discarded. Otherwise, control passes to 624.

At 624, the received audio input may be converted into a text input. The speech-to-text engine 208 may be configured to convert the received audio input into the text input and communicate the converted text input to the processor 204, as described in detail, for example, in FIG. 3A.

At 626, a plurality of keywords and a plurality of phrases may be retrieved. The processor 204 may be configured to retrieve the plurality of keywords and the plurality of phrases from the memory 210. The processor 204 may be configured to update the plurality of keywords and the plurality of phrases from the multimedia content source 104.

At 628, the converted text input may be compared with the retrieved plurality of keywords and the plurality of phrases. The processor 204 may be configured to compare the converted text input with the retrieved the plurality of keywords and the plurality of phrases.

At 630, it may be determined whether the text input matches with the retrieved plurality of keywords and/or the plurality of phrases. The processor 204 may be configured to determine whether the text input match with the retrieved the plurality of keywords or the plurality of phrases. In cases where the converted text input matches with one of the retrieved the plurality of keywords or the plurality of phrases, control passes to 632. Otherwise, control passes to 636, where the audio input may be treated as an unrecognizable command.

At 632, a voice command for the HMD 102 may be determined based on the received audio input. The processor 204 may be configured to determine the voice command for the HMD 102, based on the received audio input.

At 634, a function of the HMD 102 may be controlled based on the determined voice command. The processor 204 may be configured to control the function of the HMD 102, based on the determined voice command. Examples of different functions are described in detail, for example, in FIGS. 1 and 3A.

At 636, the received audio input may be discarded. The processor 204 may be configured to discard the received audio input, based on the determination that the received audio input is not enunciated from the wearer of the HMD 102. The processor 204 may be configured to further discard the received audio input, based on a determination that the voice signature of the received audio input matches with one of the voice signatures of the blocked users. The processor 204 may be configured to further discard the received audio input, based on the determination that the HMD 102 is not in the worn state. Control passes to end.

Various embodiments of the disclosure provide a head-mounted device (e.g., the HMD 102). The HMD 102 may include at least one speaker (e.g. the plurality of speakers 216) and at least one audio capturing device (e.g. the plurality of audio capturing devices 218) and circuitry (e.g., the circuitry 202), coupled to the at least one speaker and the at least one audio capturing device. The circuitry 202 may be configured to receive, via the at least one audio capturing device, a user input that may correspond to an audio input. The circuitry 202 may be further configured to determine a first location of a source of the received audio input, based on the received audio input. The circuitry 202 may be further configured to determine the received audio input is enunciated from a wearer of the HMD in a worn state of the HMD 102, based on the determined first location of the source of the received audio input. The circuitry 202 may be further configured to control at least a function of the HMD 102 based on the determination the received audio input is enunciated from the wearer.

In accordance with an embodiment, the circuitry 202 may be further configured to determine a distance between the source and the HMD 102 in the worn state, based on the received audio input. The circuitry 202 may be further configured to determine the received audio input is enunciated from the wearer of the HMD 102 in the worn state, based on the determined distance between the source and the HMD 102. The circuitry 202 may be further configured to control at least the function of the HMD 102 based on the determination the received audio input is enunciated from the wearer.

In accordance with an embodiment, the circuitry 202 may be further configured to determine the received audio input is enunciated from the wearer of the HMD 102 based on a determination the distance between the source and the HMD 102 is equal to or less than a threshold value.

In accordance with an embodiment, the circuitry may be further configured to detect at least one of a sound strength of the received audio input, a direction of incidence of the received audio input, or an angle of arrival of the received audio input, based on the received audio input. The circuitry 202 may be further configured to determine the first location of the source of the received audio input and the distance between the source and the HMD 102 in the worn state, based on at least one of the detected sound strength, the detected direction of incidence, or the detected angle of arrival.

In accordance with an embodiment, the circuitry 202 may be further configured to detect at least one of the sound strength, the direction of incidence, or the angle of arrival, based on output signals of the plurality of audio capturing devices 218. In accordance with an embodiment, the circuitry 202 may be further configured to determine the received audio input is enunciated from the wearer of the HMD 102 in the worn state, based on a determination that the first location of the source of the received audio input is within a threshold range from a location of the HMD 102 in the worn state.

In accordance with an embodiment, the HMD 102 may be communicatively connected to a multimedia content source (e.g., the multimedia content source 104) via a network (e.g., the communication network 106). Based on the determination the received audio input is enunciated from the wearer, the circuitry 202 may be further configured to control at least the function of the HMD 102 to transmit a request to the multimedia content source 104 for audio content, receive, from the multimedia content source 104, the audio content based on the transmitted request, and control output, via the at least one speaker, of the received audio content.

In accordance with an embodiment, the function may correspond to at least one of: control of the HMD 102 to terminate output of first audio content rendered via the at least one speaker, control of the HMD 102 to start the output of the first audio content via the at least one speaker, control of the HMD 102 to pause the output of the first audio content, or control of the HMD 102 to switch the output of the first audio content with the output of second audio content via the at least one speaker. The function may further correspond to at least one of: control of the HMD 102 to switch from a noise cancellation mode of the HMD to an ambient noise mode of the HMD, control of the HMD 102 to increase volume of the output of the first audio content, control of the HMD 102 to decrease the volume of the output of the first audio content, or control of the HMD 102 to output a particular sound via the at least one speaker.

In accordance with an embodiment, the HMD 102 may further include a memory (e.g., the memory 210). The memory 210 may be configured to store at least one of a plurality of keywords, a plurality of phrases, or a plurality of sound patterns. In accordance with an embodiment, the circuitry 202 may be further configured to compare the received audio input with the stored at least one of the plurality of keywords, the plurality of phrases, or the plurality of sound patterns. The circuitry 202 may be further configured to determine that the received audio input matches with the stored at least one of the plurality of keywords, the plurality of phrases, or the plurality of sound patterns. The circuitry 202 may be further configured to determine that the received audio input is enunciated from the wearer of the HMD 102 in the worn state of the HMD 102, based on the determination the received audio input matches with the stored at least one of the plurality of keywords, the plurality of phrases, or the plurality of sound patterns. The circuitry 202 may be further configured to control at least the function based on the determination the received audio input is enunciated from the wearer.

In accordance with an embodiment, the HMD 102 may be further communicatively connected to an electronic device (e.g., the first electronic device 506 and the second electronics device 508), via the network. The circuitry 202 may be further configured to communicate with the electronic device based on the received audio input. The received audio input may further correspond to a first command to connect the HMD 102 with the electronic device.

In accordance with an embodiment, the circuitry 202 may be further configured to transfer audio content to the electronic device based on the received audio input. The received audio input may further correspond to a second command to transfer the audio content to the electronic device.

In accordance with an embodiment, the memory 210 may be further configured to store a list of blocked users and a voice signature for each of the blocked users. The circuitry 202 may be further configured to determine a voice signature based on the received audio input. The circuitry 202 may be further configured to compare the determined voice signature with the stored voice signatures. The circuitry 202 may be further configured to identify a user from the list of blocked users based on the comparison of the determined voice signature with the stored voice signatures. The circuitry 202 may be further configured to discard the received audio input enunciated from the identified user (i.e. a blocked user).

In accordance with an embodiment, the circuitry 202 may be further configured to discard the received audio input, based on a determination the received audio input is enunciated from a person other than the wearer of the HMD 102. In accordance with an embodiment, the HMD may further include a location sensor (e.g. location sensors 222) the circuitry may be further configured to track a second location of the HMD 102 through the location sensor 222. The circuitry 202 may be further configured to receive a location signal, which may indicate the first location of the source, from an electronic device associated with the source. The circuitry 202 may be further configured to determine a distance between the source and the HMD 102, based on the tracked second location of the HMD and the received location signal. The circuitry 202 may be further configured to output a sound signal via the at least one speaker, wherein an intensity of the sound signal is based on the determined distance.

In accordance with an embodiment, the circuitry 202 may be further configured to output information related to the second location of the HMD to the electronic device. The information may indicate a path from the first location to the second location. In accordance with an embodiment, the circuitry 202 may be further configured to identify the wearer of the HMD 102 and the worn state of the HMD 102, based on an extent of outstretch of the HMD 102.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A head-mounted device (HMD), comprising:
at least one speaker;
at least one audio capturing device; and
circuitry, coupled to the at least one speaker and the at least one audio capturing device, wherein the circuitry is configured to:
receive, via the at least one audio capturing device, a user input, wherein the user input corresponds to an audio input;
determine a distance between a first location of a source of the received audio input and the HMD in a worn state, based on the received audio input;
determine the received audio input is enunciated from a wearer of the HMD in the worn state of the HMD, based on the determined distance between the first location of the source of the received audio input and the HMD in the worn state; and
control at least a function of the HMD based on the determination the received audio input is enunciated from the wearer.

2. The HMD according to claim 1, wherein the circuitry is further configured to:
determine the distance between the source and the HMD is one of equal to or less than a threshold value; and
determine the received audio input is enunciated from the wearer of the HMD based on the determined distance between the source and the HMD is one of equal to or less than the threshold value.

3. The HMD according to claim 1, wherein the circuitry is further configured to:
   detect at least one of a sound strength of the received audio input, a direction of incidence of the received audio input, or an angle of arrival of the received audio input based on the received audio input, and
   determine the first location of the source of the received audio input and the distance between the source and the HMD in the worn state based on at least one of the detected sound strength, the detected direction of incidence, or the detected angle of arrival.

4. The HMD according to claim 3, further comprising a plurality of audio capturing devices,
   wherein the circuitry is further configured to detect at least one of the sound strength, the direction of incidence, or the angle of arrival based on output signals of the plurality of audio capturing devices.

5. The HMD according to claim 1, wherein the circuitry is further configured to:
   determine the first location of the source of the received audio input is within a threshold range from a location of the HMD in the worn state; and
   determine the received audio input is enunciated from the wearer of the HMD in the worn state based on the determination the first location of the source of the received audio input is within the threshold range from the location of the HMD in the worn state.

6. The HMD according to claim 1, wherein the HMD is communicatively connected to a multimedia content source device via a network, and
   wherein, based on the determination the received audio input is enunciated from the wearer, the circuitry is further configured to control at least the function of the HMD to
   transmit a request to the multimedia content source device for audio content;
   receive, from the multimedia content source device, the audio content according to the transmitted request; and
   control output, via the at least one speaker, of the received audio content.

7. The HMD according to claim 1,
   wherein at least the function corresponds to at least one of
   control of the HMD to terminate output of first audio content rendered via the at least one speaker,
   control of the HMD to start the output of the first audio content via the at least one speaker,
   control of the HMD to pause the output of the first audio content, or
   control of the HMD to switch the output of the first audio content with the output of second audio content via the at least one speaker.

8. The HMD according to claim 7, wherein at least the function corresponds to at least one of
   control of the HMD to switch from a noise cancellation mode of the HMD to an ambient noise mode of the HMD,
   control of the HMD to increase volume of the output of the first audio content,
   control of the HMD to decrease the volume of the output of the first audio content, or
   control of the HMD to output a particular sound via the at least one speaker.

9. The HMD according to claim 1, further comprising:
   a memory configured to store at least one of a plurality of keywords, a plurality of phrases, or a plurality of sound patterns.

10. The HMD according to claim 9, wherein the circuitry is further configured to:
    compare the received audio input with the stored at least one of the plurality of keywords, the plurality of phrases, or the plurality of sound patterns;
    determine the received audio input matches with the stored at least one of the plurality of keywords, the plurality of phrases, or the plurality of sound patterns;
    determine the received audio input is enunciated from the wearer of the HMD in the worn state of the HMD based on the determination the received audio input matches with the stored at least one of the plurality of keywords, the plurality of phrases, or the plurality of sound patterns; and
    control at least the function based on the determination the received audio input is enunciated from the wearer.

11. The HMD according to claim 1,
    wherein the HMD is communicatively connected to an electronic device via a network,
    wherein the circuitry is further configured to communicate with the electronic device based on the received audio input, and
    wherein the received audio input corresponds to a first command to connect the HMD with the electronic device.

12. The HMD according to claim 11, wherein the circuitry is further configured to transfer audio content to the electronic device based on the received audio input, and wherein the received audio input corresponds to a second command to transfer the audio content to the electronic device.

13. The HMD according to claim 1, further comprising a memory configured to store a list of blocked users and a voice signature for each of the blocked users, wherein the circuitry is further configured to:
    determine a voice signature based on the received audio input;
    compare the determined voice signature with the stored voice signatures;
    identify a user from the list of blocked users based on the comparison of the determined voice signature with the stored voice signatures; and
    discard the received audio input that is enunciated from the identified user.

14. The HMD according to claim 1, wherein the circuitry is further configured to:
    determine the received audio input is enunciated from a person other than the wearer of the HMD; and
    discard the received audio input based on the determination the received audio input is enunciated from the person other than the wearer of the HMD.

15. The HMD according to claim 1, further comprising a location sensor, wherein the circuitry is further configured to:
    track a second location of the HMD through the location sensor;
    receive a location signal, indicating the first location of the source, from an electronic device associated with the source;
    determine the distance between the source and the HMD based on the tracked second location of the HMD and the received location signal; and output a sound signal via the at least one speaker, wherein an intensity of the sound signal is based on the determined distance.

16. The HMD according to claim 15, wherein the circuitry is further configured to output information related to the second location of the HMD to the electronic device, wherein the information indicates a path from the first location to the second location.

17. The HMD according to claim 1, wherein the circuitry is further configured to identify the wearer of the HMD and the worn state of the HMD, based on an extent of outstretch of a headband of the HMD.

18. A method, comprising:
   in a head-mounted device (HMD) which comprises circuitry, at least one speaker, and at least one audio capturing device:
      receiving, via the at least one audio capturing device, a user input, wherein the user input corresponds to an audio input;
      determining, by the circuitry, a distance between a first location of a source of the received audio input and the HMD in a worn state based on the received audio input;
      determining, by the circuitry, the received audio input is enunciated from a wearer of the HMD in the worn state of the HMD, based on the determined distance between the first location of the source of the received audio input and the HMD in the worn state; and
      controlling, by the circuitry, at least a function of the HMD based on the determination the received audio input is enunciated from the wearer.

19. The method according to claim 18, further comprising:
   determining, by the circuitry, the received audio input is enunciated from a person other than the wearer of the HMD; and
   discarding, by the circuitry, the received audio input based on the determination the received audio input is enunciated from the person other than the wearer of the HMD.

* * * * *